United States Patent
Yu et al.

(10) Patent No.: US 9,341,337 B2
(45) Date of Patent: May 17, 2016

(54) VEHICLE HEADLIGHT DEVICE

(71) Applicants: Chih-Chieh Yu, Hsin-Chu (TW); Han-Wen Tsai, Hsin-Chu (TW)

(72) Inventors: Chih-Chieh Yu, Hsin-Chu (TW); Han-Wen Tsai, Hsin-Chu (TW)

(73) Assignee: Coretronic Corporation, Hsin-Chu (TW)

(*) Notice: Subject to any disclaimer, the term of this patent is extended or adjusted under 35 U.S.C. 154(b) by 97 days.

(21) Appl. No.: 14/506,109

(22) Filed: Oct. 3, 2014

(65) Prior Publication Data

US 2015/0192265 A1  Jul. 9, 2015

(30) Foreign Application Priority Data

Jan. 8, 2014  (TW) .............................. 103100572 A (51) Int. Cl.
*F21S 8/10* (2006.01)
*F21V 8/00* (2006.01)

(52) U.S. Cl.
CPC ........... *F21S 48/1241* (2013.01); *G02B 6/0018* (2013.01); *G02B 6/0031* (2013.01); *G02B 6/0028* (2013.01); *G02B 6/0046* (2013.01); *G02B 6/0053* (2013.01); *G02B 6/0055* (2013.01)

(58) Field of Classification Search
CPC ............. F21S 48/1763; F21S 48/1317; F21S 48/1225; F21S 48/1241; G02B 6/0018; G02B 6/0031; G02B 6/0028; G02B 6/0046; G02B 6/0055; G02B 6/0053; F21V 2200/00; F21V 2200/15; F21V 2200/20
See application file for complete search history.

(56) References Cited

U.S. PATENT DOCUMENTS

| | | | |
|---|---|---|---|
| 6,508,576 B2 * | 1/2003 | Emmelmann | B60Q 1/0058 362/228 |
| 7,073,933 B2 * | 7/2006 | Gotoh | G02B 6/0016 362/23.09 |
| 7,645,048 B2 | 1/2010 | Iwasaki et al. | |
| 7,731,402 B2 | 6/2010 | Tessnow et al. | |
| 7,985,011 B2 * | 7/2011 | Ajiki | F21S 48/1241 362/511 |
| 8,042,982 B2 | 10/2011 | Muegge | F21S 48/215 362/612 |
| 8,534,901 B2 * | 9/2013 | Panagotacos | G02B 6/002 362/615 |
| 9,250,448 B2 * | 2/2016 | Robinson | G02B 6/0048 |
| 2009/0251917 A1 | 10/2009 | Wollner et al. | |
| 2010/0315833 A1 | 12/2010 | Holman et al. | |
| 2011/0110111 A1 * | 5/2011 | Rho | F21S 48/1154 362/509 |
| 2012/0127573 A1 * | 5/2012 | Robinson | G02B 6/0048 359/464 |
| 2012/0314145 A1 | 12/2012 | Robinson | |

FOREIGN PATENT DOCUMENTS

| | | |
|---|---|---|
| CN | 102483522 | 5/2012 |
| TW | 201207452 | 2/2012 |

* cited by examiner

*Primary Examiner* — Bao Q Truong
(74) *Attorney, Agent, or Firm* — Muncy, Geissler, Olds & Lowe, P.C.

(57) ABSTRACT

A vehicle headlight device includes a light guide plate, a light source device and a light-pattern adjustment plate. A thickness of the light guide plate is gradually increased from a light incident side to a light reflection side, and the light reflection side is provided with a parabolic surface. The light source device is disposed to coincide with or be near a focus point of the parabolic surface. The parabolic surface reflects at least one light beam emitted from the light source device to allow the light beam to propagate in an alignment direction. The light-pattern adjustment plate has multiple grooves. The grooves are parallel to each other and arranged on a surface of the light-pattern adjustment plate facing the light guide plate, and a longitudinal direction of the grooves is different to the alignment direction.

20 Claims, 8 Drawing Sheets

VEHICLE HEADLIGHT DEVICE

BACKGROUND OF THE INVENTION a. Field of the Invention

The invention relates to a vehicle headlight device.

b. Description of the Related Art

Figure 8:
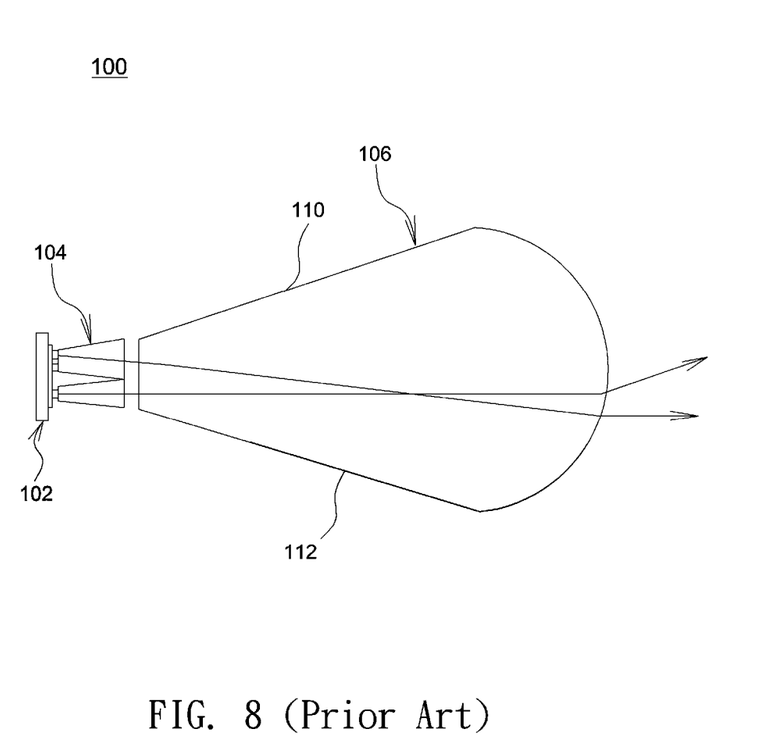
FIG. 8 shows a schematic diagram illustrating a conventional vehicle headlamp.

Nowadays, various types of LED vehicle headlamps are commercially available. As shown in FIG. 8, U.S. Pat. No. 7,731,402 discloses a vehicle headlamp 100 having an LED light source 102, a primary optical light guide 104, and a secondary optical light guide 106. The optical light guide elements 104 and 106 focus and collimate light beams emitted from the LED light source 102 to form a light pattern suitable for a vehicle headlamp. Besides, two brightness enhancement films 110 and 112 perpendicular to each other are disposed on a side surface of the secondary optical light guide 106 to redirect and recycle light.

Further, U.S. patent publication No. 2009/0251917 discloses an illumination device including a light source, a light guide and two brightness enhancement films. The brightness enhancement films function to redirect and recycle light emitted from the light source. U.S. patent publication No. 2012/0314145 discloses a backlight device including a wedge-shaped light guide plate and a re-direction film with a prism array. The light guide plate is coated with a reflective layer at the bottom, and an end of the light guide plate is provided with a wavy surface. Light beams emitted from a light source pass through the re-direction film and are collimated to be substantially parallel to each other. U.S. patent publication No. 2010/0315833 discloses an optical system having a light input engine, optical elements, and two optical films arranged to be perpendicular to each other. Each optical film has a lenticular lens array to change light-emitting angles. Taiwan patent publication No. 201207452 discloses a light-collimating film having a base layer, multiple lenticular lenses and multiple prism structures. The lenticular lenses and the prism structures are disposed on opposite sides of the base layer, and their longitudinal directions are perpendicular to each other. U.S. Pat. No. 7,645,048 discloses an optical device including a light source, a light guide plate, a prism sheet, and a reflective sheet. The light guide plate has a first inclined surface and a second inclined surface, the reflective sheet is disposed under the light guide plate and is configured in a triangular shape corresponding to the first inclined surface and the second inclined surface of the light guide plate.

However, these conventional designs may encounter some problems, such as requiring specific optical lenses, failing to accurately control light-emitting angles, causing excessive stray light, or increasing the cost for a solution to heat-dissipation problems.

BRIEF SUMMARY OF THE INVENTION

The invention provides a vehicle headlight device having proper light patterns and light-emitting angles and improved luminous efficiency.

Other objects and advantages of the invention may be further illustrated by the technical features broadly embodied and described as follows.

In order to achieve one or a portion of or all of the objects or other objects, one embodiment of the invention provides a vehicle headlight device including a light guide plate, a light source device and a light-pattern adjustment plate. The light guide plate has a light incident side, a light reflection side opposite the light incident side, a bottom surface, and a light emitting surface opposite the bottom surface. The bottom surface and the light emitting surface are both connected between the light incident side and the light reflection side, and a thickness of the light guide plate is gradually increased from the light incident side to the light reflection side. The light reflection side is provided with a parabolic surface. The light source device is disposed on the light incident side. The light source device is disposed to coincide with or be near a focus point of the parabolic surface. The parabolic surface reflects at least one light beam emitted from the light source device to allow the light beam to propagate in an alignment direction. The light-pattern adjustment plate is disposed on the light emitting surface of the light guide plate. The light-pattern adjustment plate has multiple grooves, the grooves are parallel to each other and arranged on a surface of the light-pattern adjustment plate facing the light guide plate, and a longitudinal direction of the grooves is different to the alignment direction.

In one embodiment, the longitudinal direction of the grooves is substantially perpendicular to the alignment direction.

In one embodiment, the light incident side is provided with a light incident surface, and the longitudinal direction of the grooves is substantially parallel to the light incident surface.

In one embodiment, the light emitting surface forms an angle of two degrees with respect to the bottom surface at the light incident side.

In one embodiment, at least one prism structure is disposed on a surface of the light-pattern adjustment plate facing away from the light guide plate, and the prism structure has a gradually varied thickness.

In one embodiment, a distance between the light source device and the focus point of the parabolic surface is less than 10 mm.

In one embodiment, the grooves of the light-pattern adjustment plate are V-shaped grooves, and each of the V-shaped grooves has an apex angle in a range of 45 degrees to 80 degrees.

In one embodiment, a plurality of longitudinal slots are disposed on the parabolic surface. At least a part of the light beam incident on the longitudinal slots of the light reflection side is reflected towards the light-pattern adjustment plate. The longitudinal slots may be arranged on the parabolic surface in a direction substantially perpendicular to the light emitting surface, and a length of each of the longitudinal slots is substantially the same as a length of the parabolic surface.

In one embodiment, a reflective element is disposed adjacent to the bottom surface of the light guide plate. The reflective element has a first inclined surface near the light incident side and a second inclined surface near the light reflection side. An angle formed between the first inclined surface and the bottom surface of the light guide plate is between 65 degrees and 90 degrees, and an angle formed between the second inclined surface and the bottom surface of the light guide plate is between 2 degrees and 30 degrees.

According to another embodiment of the invention, a vehicle headlight device includes a light guide plate, a light source device and a light pattern adjustment unit. The light guide plate has a light incident side, a light reflection side opposite the light incident side, a bottom surface, and a light emitting surface opposite the bottom surface. The bottom surface and the light emitting surface are both connected between the light incident side and the light reflection side, and a thickness of the light guide plate is gradually increased from the light incident side to the light reflection side. The light reflection side is provided with a parabolic surface. The light source device is disposed on the light incident side. The light source device is disposed to coincide with or be near a focus point of the parabolic surface, the parabolic surface reflects at least one light beam emitted from the light source device to allow the light beam to propagate in an alignment direction. The light pattern adjustment unit is disposed on the light emitting surface of the light guide plate, and the light-pattern adjustment unit has multiple first grooves parallel to each other and multiple second grooves parallel to each other. The first grooves and the second grooves are disposed on a surface of the light pattern adjustment unit facing the light guide plate. The first grooves extend in a first longitudinal direction, and the second grooves extend in a second longitudinal direction different to the first longitudinal direction. The first longitudinal direction and the second longitudinal direction are different to the alignment direction. An included angle formed between the first longitudinal direction and the second longitudinal direction may be larger than 0 degree and smaller than 20 degrees.

In one embodiment, the light pattern adjustment unit is a light-pattern adjustment plate. The first grooves and the second grooves are disposed on two distinct and adjacent areas of a surface of the light-pattern adjustment plate.

In one embodiment, the light pattern adjustment unit comprises a first light-pattern adjustment plate and a second light-pattern adjustment plate. The first grooves are formed on the first light-pattern adjustment plate, and the second grooves are formed on the second light-pattern adjustment plate.

According to the above embodiments, since the light source device is disposed to coincide with or be near a focus point of the parabolic surface. The parabolic surface is capable of collimating the light beams from the light source device to allow the light beams to propagate in an alignment direction. Further, the light-pattern adjustment plate may deflect a light beam from the light emitting surface of the light guide plate by the grooves to correct an emitting direction of the light beam. For example, a light beam emitted from the light emitting surface at a comparatively large angle may be deflected by the grooves of the light-pattern adjustment plate to allow the light beam to emit in a direction perpendicular to the light guide plate. Under the circumstance, light-emitting angles of the vehicle headlight device can be adjusted or narrowed both in a direction parallel to the light incident surface (such as by the deflection of the longitudinal grooves) and in a direction perpendicular to the light incident surface (such as by the collimation of the parabolic surface or by the collimation of the prism structures) to form a proper light pattern suitable for a vehicle headlight device. Besides, a reflective element disposed adjacent to the bottom surface of the light guide plate may function to recycle light to enhance overall light utilization efficiency. According to the above embodiments, a light guide plate and at least one light-pattern adjustment plate are provided to cooperate for generating an output light pattern of a vehicle headlight device. In that case, the angles and distributions of the grooves, slots and prism structures are allowed to be adjusted to control light-emitting angles and form symmetry or non- symmetry light patterns easily. Therefore, the above embodiments may overcome or reduce the problems of conventional designs, such as requiring specific optical lenses, failing to accurately control light-emitting angles, causing excessive stray light, or increasing the cost for a solution to heat-dissipation problems.

Other objectives, features and advantages of the invention will be further understood from the further technological features disclosed by the embodiments of the invention wherein there are shown and described preferred embodiments of this invention, simply by way of illustration of modes best suited to carry out the invention.

DETAILED DESCRIPTION OF THE INVENTION

In the following detailed description of the preferred embodiments, reference is made to the accompanying drawings which form a part hereof, and in which are shown by way of illustration specific embodiments in which the invention may be practiced. In this regard, directional terminology, such as "top," "bottom," "front," "back," etc., is used with reference to the orientation of the Figure(s) being described. The components of the invention can be positioned in a number of different orientations. As such, the directional terminology is used for purposes of illustration and is in no way limiting. On the other hand, the drawings are only schematic and the sizes of components may be exaggerated for clarity. It is to be understood that other embodiments may be utilized and structural changes may be made without departing from the scope of the invention. Also, it is to be understood that the phraseology and terminology used herein are for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted" and variations thereof herein are used broadly and encompass direct and indirect connections, couplings, and mountings. Similarly, the terms "facing," "faces" and variations thereof herein are used broadly and encompass direct and indirect facing, and "adjacent to" and variations thereof herein are used broadly and encompass directly and indirectly "adjacent to". Therefore, the description of "A" component facing "B" component herein may contain the situations that "A" component directly faces "B" component or one or more additional components are between "A" component and "B" component. Also, the description of "A" component "adjacent to" "B" component herein may contain the situations that "A" component is directly "adjacent to" "B" component or one or more additional components are between "A" component and "B" component. Accordingly, the drawings and descriptions will be regarded as illustrative in nature and not as restrictive.

Figure 1:
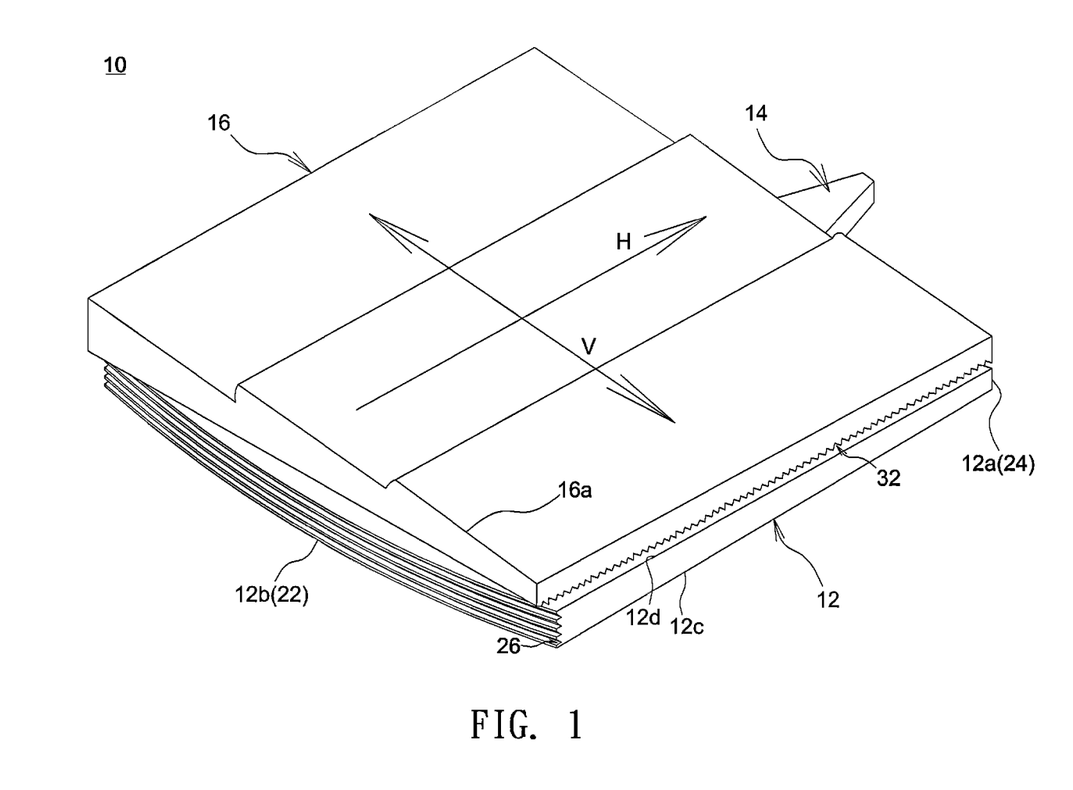
FIG. 1 and FIG. 2 respectively show a perspective view and a schematic cross-section of a vehicle headlight device according to an embodiment of the invention.
Figure 2:
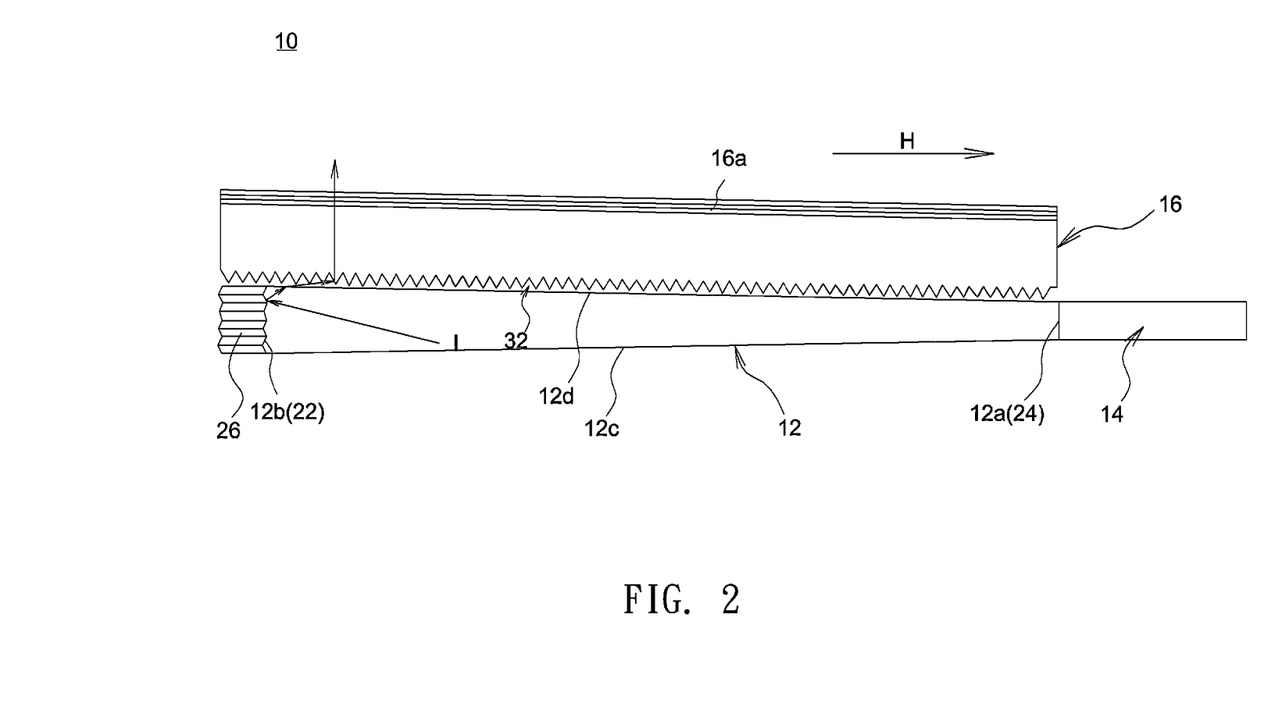

FIG. 1 and FIG. 2 respectively show a perspective view and a schematic cross-section of a vehicle headlight device according to an embodiment of the invention. Please refer to both FIG. 1 and FIG. 2, a vehicle headlight device 10 includes a light guide plate 12, a light source device 14, and a light-pattern adjustment plate 16. The light guide plate 12 has a light incident side 12a, a light reflection side 12b opposite the light incident side 12a, a bottom surface 12c, and a light emitting surface 12d opposite the bottom surface 12c. The bottom surface 12c and the light emitting surface 12d are both connected between the light incident side 12a and the light reflection side 12b. The bottom surface 12c may be coated with a reflective layer (not shown), and a thickness of the light guide plate 12 is gradually increased from the light incident side 12a to the light reflection side 12b. The light source device 14 may include at least one light emitting diode, and the light emitting surface 12d may, for example, form an angle of two degrees with respect to the bottom surface 12c at the light incident side 12a. The light reflection side 12b of the light guide plate 12 may be provided with a parabolic surface 22, and, in this embodiment, the parabolic surface 22 may be coated with a reflective layer. The light incident side 12a is provided with a light incident surface 24, and the light source device 14 is disposed on the light incident side 12a. The light source device 14 may coincide with or may be near a focus point of the parabolic surface 22. Light beam emitted from the light source device 14 enters the light guide plate 12 via the light incident surface 24 and propagates in fan-shaped towards the light reflection side 12b. The parabolic surface 22, through its geometric shape, is capable of reflecting incoming light beams and directing the light beams to propagate in an alignment direction H. Therefore, the light beams reflected by the parabolic surface 22 are collimated to be substantially parallel to each other to meet a basic requirement of a vehicle headlamp that casts light on a distant place. In one embodiment, a distance between the light source device 14 and the focus point of the parabolic surface 22 may be less than 10 millimeters (mm). Multiple longitudinal slots 26 are arranged on the parabolic surface 22 in a direction substantially perpendicular to the light emitting surface 12d of the light guide plate 12, and a length of each longitudinal slot 26 is substantially the same as a length of the parabolic surface 22. Each longitudinal slot 26 may be V-shaped. An exemplify light path (indicated by arrows) can be seen in FIG. 2, where a light beam I that is reflected by the bottom surface 12c to propagate towards the light reflection side 12b is further reflected by the longitudinal slots 26 to back to the light guide plate 12, and then the light beam I emits via the light emitting surface 12d to improve luminous efficiency. Further, a light-pattern adjustment plate 16 may be stacked on the light emitting surface 12d of the light guide plate 12. In this embodiment, multiple grooves 32 parallel to each other are arranged on a surface of the light-pattern adjustment plate 16 facing the light guide plate 12. The grooves 32 may be, but not limited to, V-shaped longitudinal grooves, and each of the V-shaped grooves may have an apex angle in a range of approximately 45 degrees to 80 degrees. A longitudinal direction V of the grooves 32 may be substantially parallel to the light incident surface 24 of the light guide plate 12; that is, the longitudinal direction V is substantially perpendicular to a normal direction (not shown) of the light incident surface 24. And the longitudinal direction V is substantially perpendicular to the alignment direction H of light beams collimated by the parabolic surface 22.

According to the above embodiments, the light beam entering from the light incident side 12a of the light guide plate 12 is transmitted to the parabolic surface 22 at the light reflection side 12b, and the thickness of the light guide plate 12 is gradually increased from the light incident side 12a to the light reflection side 12b to form a wedge-shape. Therefore, inside the light guide plate 12 an incident angle of the totally reflected light beam from the parabolic surface 22 is gradually decreased with respect to an inclined surface of the wedge-shaped light guide plate 12 and finally smaller than a critical angle, and it follows that the light beam leaves the light guide plate 12 via the light emitting surface 12d. Besides, since the light source device 14 is disposed in a position coinciding with or near a focus point of the parabolic surface 22, the parabolic surface 22 is capable of collimating the light beams from the light source device 14 to allow the light beams to be substantially parallel to each other and propagate in an alignment direction H. Further, the light-pattern adjustment plate 16 may deflect a light beam from the light emitting surface 12d of the light guide plate 12 by the grooves 32 to correct an emitting direction of the light beam. For example, a light beam emitted from the light emitting surface 12d at a comparatively large angle may be deflected by the grooves 32 of the light-pattern adjustment plate 16 to allow the light beam to emit at a direction substantially perpendicular to the light guide plate 12. Under the circumstance, light-emitting angles of the vehicle headlight device 10 can be adjusted or narrowed both in a direction parallel to the light incident surface 12a (such as by the deflection of the longitudinal grooves 32) and in a direction perpendicular to the light incident surface 12a (such as by the collimation of the parabolic surface 22) to form a proper light pattern suitable for a vehicle headlight device.

Further, in this embodiment, at least one prism structure 16a may be disposed on a surface of the light-pattern adjustment plate 16 facing away from the light guide plate 12. As shown in FIG. 1, three prism structures 16a are disposed on the surface. Each prism structure 16a has at least one inclined surface sloping down to one side of the light-pattern adjustment plate 16 to provide a gradually varied thickness. The prism structures 16a may function to control light-emitting angles and adjust an output light pattern. Further, the inclined surface of each prism structure 16a may slope in a direction identical or different to the longitudinal direction V of the grooves 32, and each prism structure 16a may be constructed by a planar surface or a curve surface.

Figure 3:
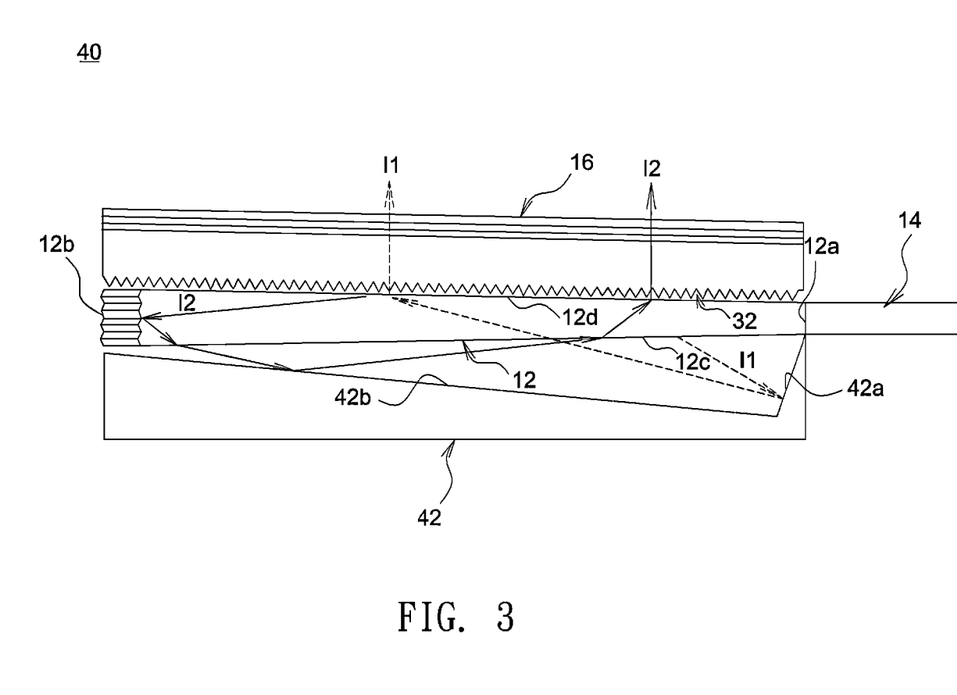
FIG. 3 shows a schematic diagram illustrating a vehicle headlight device according to another embodiment of the invention.

FIG. 3 shows a schematic diagram illustrating a vehicle headlight device according to another embodiment of the invention. As shown in FIG. 3, the vehicle headlight device 40 includes a reflective element 42, and the bottom surface 12c of the light guide plate 12 is not coated with a reflective layer. The reflective element 42 is disposed adjacent to the bottom surface 12c of the light guide plate 12. The reflective element 42 has an inclined surface 42a and an inclined surface 42b. The inclined surface 42a faces toward the bottom surface 12c and is comparatively near the light incident side 12a. The inclined surface 42b faces toward the bottom surface 12c and is comparatively near the light reflection side 12b. The inclined surface 42a and the inclined surface 42b are connected with each other at one end. An angle formed between the inclined surface 42a and the bottom surface 12c of the light guide plate 12 may be approximately between 65 degrees and 90 degrees, and an angle formed between the inclined surface 42b and the bottom surface 12c of the light guide plate 12 may be approximately between 2 degrees and 30 degrees. Note the inclined surface 42a or the inclined surface 42b may not contact with the bottom surface 12c of the light guide plate 12, and an included angle between two surfaces, such as the inclined surface 42a and the bottom surface 12c, may be formed by imaginary planes extending from the inclined surface 42a and the bottom surface 12c. According to this embodiment, a light beam I1 leaking from the bottom surface 12c of the light guide plate 12 is reflected by the inclined surface 42a of the reflective element 42 and sequentially passes through the light guide plate 12. Then the light beam I1 emitting from the light emitting surface 12d is deflected by the light-pattern adjustment plate 16 to emit in a direction perpendicular to the light guide plate 12. Further, a light beam I2 successively reflected by the light-pattern adjustment plate 16 and the reflection side 12b of the light guide plate 12 leaks from the bottom surface 12c of the light guide plate 12 and is incident on the inclined surface 42b. Then the light beam I2 is reflected back to pass through the light guide plate 12 and further deflected by the grooves 32 of the light-pattern adjustment plate 16 to emit in a direction perpendicular to the light guide plate 12. Therefore, the reflective element 42 may function to recycle light to enhance overall light utilization efficiency.

Figure 4:
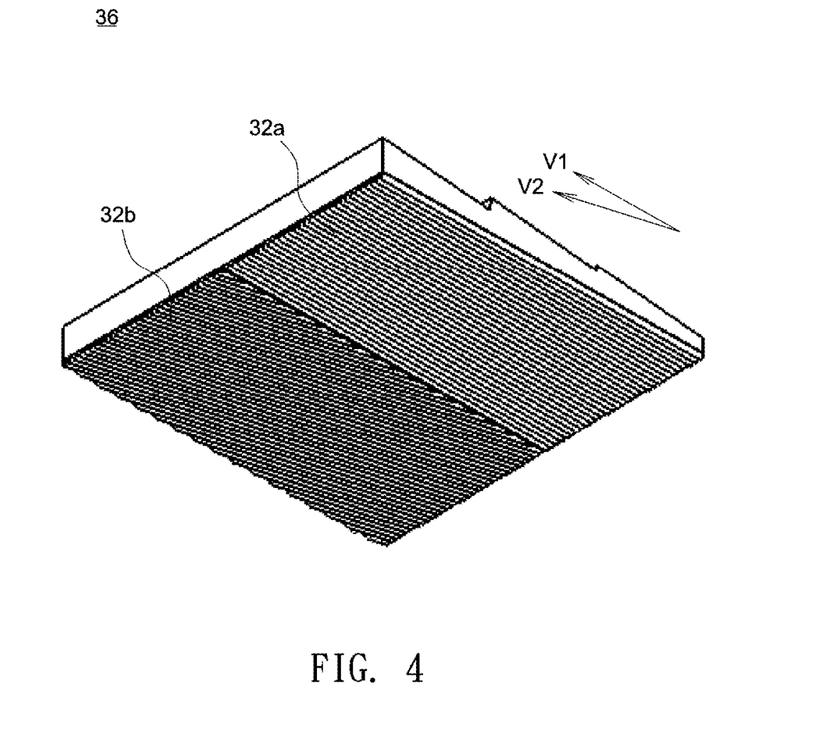
FIG. 4 shows a schematic diagram illustrating a light-pattern adjustment plate according to another embodiment of the invention.
Figure 5:
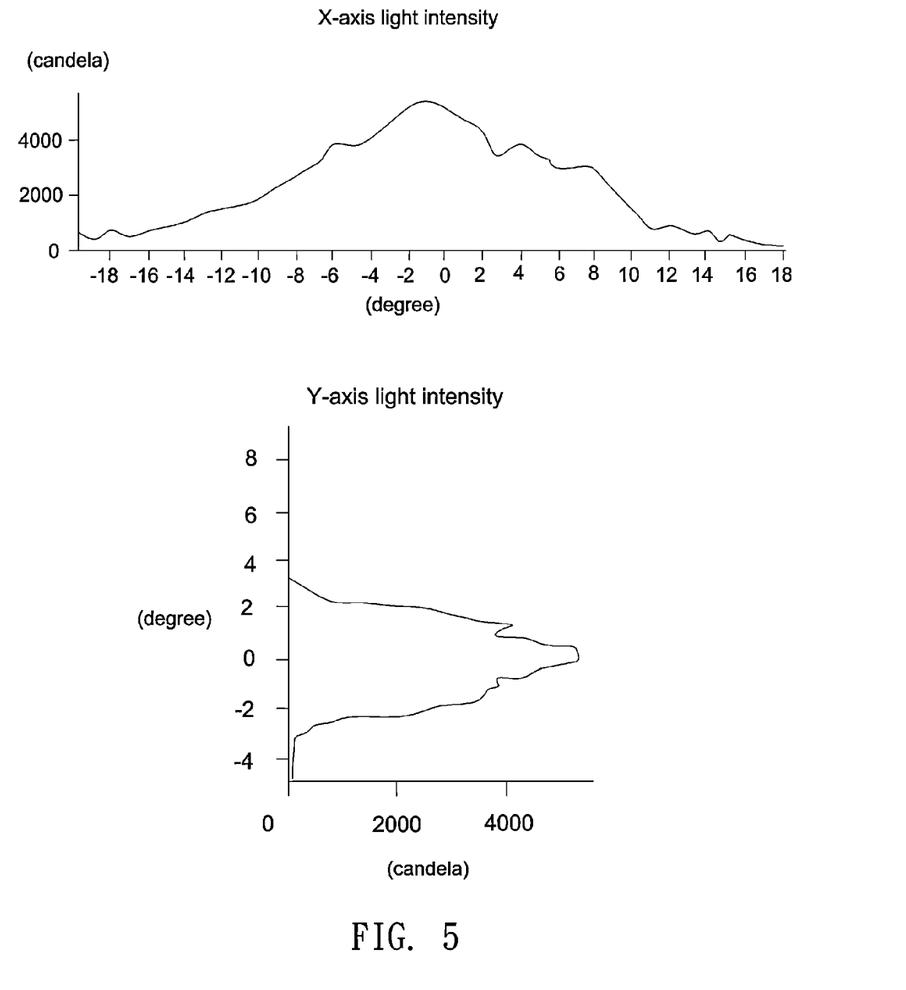
FIG. 5 and FIG. 6 show schematic diagrams of output light patterns, where the light pattern shown in FIG. 5 is output by a light-pattern adjustment plate shown in FIG. 1, and the light pattern shown in FIG. 6 is output by a light-pattern adjustment plate shown in FIG. 4.
Figure 6:
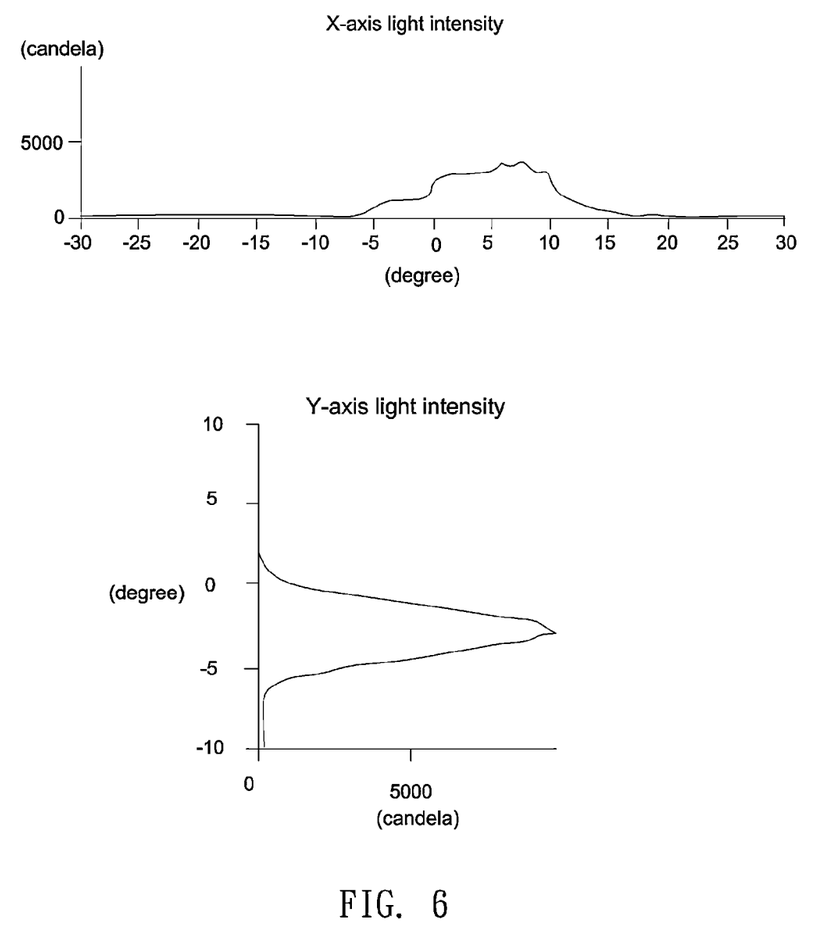

Normally, a vehicle headlight device may output a non-symmetric pattern to conform to the vehicle headlamp standards. As shown in FIG. 4, according to another embodiment of the invention, a light-pattern adjustment plate 36 is provided with multiple grooves arranged in different directions on a surface facing a light guide plate. Note, in this embodiment, an arrangement of the light-pattern adjustment plate 36 relative to a light guide plate is similar to the arrangement shown in FIG. 1, and thus a light guide plate is not shown in FIG. 4 for the sake of simplicity. The light-pattern adjustment plate 36 may have multiple first grooves 32a parallel to each other and multiple second grooves 32b parallel to each other. The first grooves 32a and the second grooves 32b may be configured in a longitudinal V shape and disposed on two distinct and adjacent areas of a surface facing a light guide plate (not shown). The first grooves 32a extend in a first longitudinal direction V1, the second grooves 32b extend in a second longitudinal direction V2 different to the first longitudinal direction V1, and the first longitudinal direction V1 and the second longitudinal direction V2 are different to the alignment direction H. In one embodiment, an included angle formed between the first longitudinal direction V1 and the second longitudinal direction V2 may be larger than 0 degree and smaller than 20 degrees. The first longitudinal direction V1 may be substantially parallel to a light incident surface of a light guide plate. FIG. 5 and FIG. 6 show schematic diagrams of output light patterns, where the light pattern shown in FIG. 5 is output by a light-pattern adjustment plate shown in FIG. 1, and the light pattern shown in FIG. 6 is output by a light-pattern adjustment plate shown in FIG. 4. Referring to FIG. 5, a vehicle headlight device using the light-pattern adjustment plate 16 shown in FIG. 1 may provide a symmetric light pattern with a horizontal divergence angle of about 15 degrees and a vertical divergence angle of about 4 degrees. In comparison, as shown in FIG. 6, a vehicle headlight device using the light-pattern adjustment plate 36 shown in FIG. 4 may provide a non-symmetric light pattern with respect to both a horizontal direction and a vertical direction to conform to vehicle headlamp standards such as the ECE standard (Regulation of Economic Commission for Europe).

Figure 7:
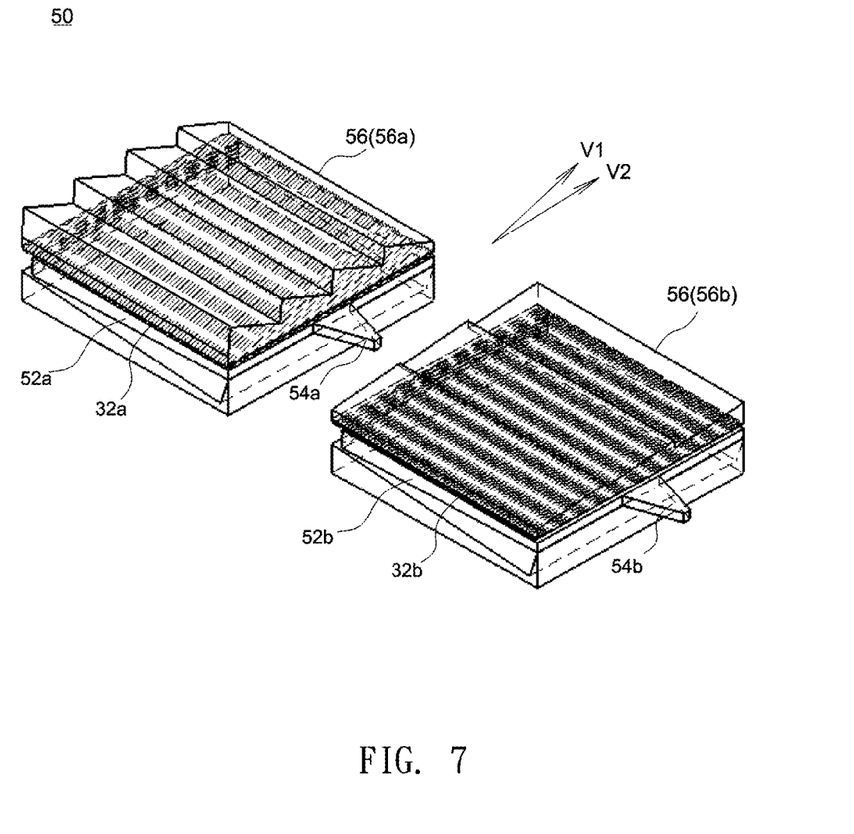
FIG. 7 shows a schematic diagram of a vehicle headlight device capable of providing a non-symmetric light pattern according to another embodiment of the invention.

FIG. 7 shows a schematic diagram of a vehicle headlight device capable of providing a non-symmetric light pattern according to another embodiment of the invention. As shown in FIG. 7, a light pattern adjustment unit 56 of a vehicle headlight device 50 includes a first light-pattern adjustment plate 56a and a second light-pattern adjustment plate 56b adjacent to the first light-pattern adjustment plate 56a. The first light-pattern adjustment plate 56a may have multiple first grooves 32a parallel to each other and extending in a first longitudinal direction V1, and the second light-pattern adjustment plate 56b may have multiple second grooves 32b parallel to each other and extending in a second longitudinal direction V2. The first longitudinal direction V1 of the first grooves 32a and the second longitudinal direction V2 of the second grooves 32b are different to the alignment direction H. An included angle formed between the first longitudinal direction V1 and the second longitudinal direction V2 may be larger than 0 degree and smaller than 20 degrees, and the first longitudinal direction V1 may be substantially parallel to a light incident surface of a light guide plate 52a. According to this embodiment, the first light-pattern adjustment plate 56a and the second light-pattern adjustment plate 56b are adjacent to and parallel to each other, the light-pattern adjustment plate 56a and the second light-pattern adjustment plate 56b may match their respective light guide plates 52a and 52b and light source devices 54a and 54b to similarly provide a non-symmetry light pattern.

According to the above embodiments, a light guide plate and at least one light-pattern adjustment plate are provided to cooperate for generating an output light pattern of a vehicle headlight device. In that case, the angles and distributions of the grooves, slots and prism structures are allowed to be adjusted so as to control light-emitting angles and form symmetry or non-symmetry light patterns easily. Therefore, the above embodiments may overcome or reduce the problems of conventional designs, such as requiring specific optical lenses, failing to accurately control light-emitting angles, causing excessive stray light, or increasing the cost for a solution to heat-dissipation problems.

The foregoing description of the preferred embodiments of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "the present invention" or the like does not necessarily limit the claim scope to a specific embodiment, and the reference to particularly preferred exemplary embodiments of the invention does not imply a limitation on the invention, and no such limitation is to be inferred. The invention is limited only by the spirit and scope of the appended claims. Moreover, these claims may refer to use "first", "second", etc. following with noun or element. Such terms should be understood as a nomenclature and should not be construed as giving the limitation on the number of the elements modified by such nomenclature unless specific number has been given. The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. Any advantages and benefits described may not apply to all embodiments of the invention. It should be appreciated that variations may be made in the embodiments described by persons skilled in the art without departing from the scope of the invention as defined by the following claims. Moreover, no element and component in the present disclosure is intended to be dedicated to the public regardless of whether the element or component is explicitly recited in the following claims.

What is claimed is:

1. A vehicle headlight device, comprising:
a light guide plate having a light incident side, a light reflection side opposite the light incident side, a bottom surface, and a light emitting surface opposite the bottom surface, wherein the bottom surface and the light emitting surface are both connected between the light incident side and the light reflection side, a thickness of the light guide plate is gradually increased from the light incident side to the light reflection side, and the light reflection side is provided with a parabolic surface;
a light source device disposed on the light incident side, wherein the light source device is disposed to coincide with or be near a focus point of the parabolic surface, and the parabolic surface reflects at least one light beam emitted from the light source device to allow the light beam to propagate in an alignment direction; and
a light-pattern adjustment plate disposed on the light emitting surface of the light guide plate, wherein the light-pattern adjustment plate has multiple grooves, the grooves are parallel to each other and arranged on a surface of the light-pattern adjustment plate facing the light guide plate, and a longitudinal direction of the grooves is different to the alignment direction.

2. The vehicle headlight device as claimed in claim 1, where the longitudinal direction of the grooves is substantially perpendicular to the alignment direction.

3. The vehicle headlight device as claimed in claim 1, wherein the light incident side is provided with a light incident surface, and the longitudinal direction of the grooves is substantially parallel to the light incident surface.

4. The vehicle headlight device as claimed in claim 1, wherein the light emitting surface forms an angle of two degrees with respect to the bottom surface at the light incident side.

5. The vehicle headlight device as claimed in claim 1, further comprising:
at least one prism structure disposed on a surface of the light-pattern adjustment plate facing away from the light guide plate.

6. The vehicle headlight device as claimed in claim 5, wherein the prism structure has a gradually varied thickness.

7. The vehicle headlight device as claimed in claim 1, wherein a distance between the light source device and the focus point of the parabolic surface is less than 10 mm.

8. The vehicle headlight device as claimed in claim 1, wherein the grooves of the light-pattern adjustment plate are V-shaped grooves, and each of the V-shaped grooves has an apex angle in a range of 45 degrees to 80 degrees.

9. The vehicle headlight device as claimed in claim 1, further comprising:
a plurality of longitudinal slots disposed on the parabolic surface, wherein at least a part of the light beam incident on the longitudinal slots of the light reflection side is reflected towards the light-pattern adjustment plate.

10. The vehicle headlight device as claimed in claim 9, wherein the longitudinal slots are arranged on the parabolic surface in a direction substantially perpendicular to the light emitting surface, and a length of each of the longitudinal slots is substantially the same as a length of the parabolic surface.

11. The vehicle headlight device as claimed in claim 1, further comprising:
a reflective element disposed adjacent to the bottom surface of the light guide plate, wherein the reflective element has a first inclined surface near the light incident side and a second inclined surface near the light reflection side, an angle formed between the first inclined surface and the bottom surface of the light guide plate is between 65 degrees and 90 degrees, and an angle formed between the second inclined surface and the bottom surface of the light guide plate is between 2 degrees and 30 degrees.

12. A vehicle headlight device, comprising:
a light guide plate having a light incident side, a light reflection side opposite the light incident side, a bottom surface, and a light emitting surface opposite the bottom surface, wherein the bottom surface and the light emitting surface are both connected between the light incident side and the light reflection side, a thickness of the light guide plate is gradually increased from the light incident side to light reflection side, and the light reflection side is provided with a parabolic surface;
a light source device disposed on the light incident side, wherein the light source device is disposed to coincide with or be near a focus point of the parabolic surface, and the parabolic surface reflects at least one light beam emitted from the light source device to allow the light beam to propagate in an alignment direction; and
a light pattern adjustment unit disposed on the light emitting surface of the light guide plate, wherein the light-pattern adjustment unit has multiple first grooves parallel to each other and multiple second grooves parallel to each other, the first grooves and the second grooves are disposed on a surface of the light pattern adjustment unit facing the light guide plate, the first grooves extend in a first longitudinal direction, the second grooves extend in a second longitudinal direction different to the first longitudinal direction, and the first longitudinal direction and the second longitudinal direction are different to the alignment direction.

13. The vehicle headlight device as claimed in claim 12, wherein an included angle formed between the first longitudinal direction and the second longitudinal direction is larger than 0 degree and smaller than 20 degrees.

14. The vehicle headlight device as claimed in claim 12, wherein the light pattern adjustment unit is a light-pattern adjustment plate, the first grooves and the second grooves are disposed on two distinct and adjacent areas of a surface of the light-pattern adjustment plate.

15. The vehicle headlight device as claimed in claim 12, wherein the light pattern adjustment unit comprises a first light-pattern adjustment plate and a second light-pattern adjustment plate, the first grooves are formed on the first light-pattern adjustment plate, and the second grooves are formed on the second light-pattern adjustment plate.

16. The vehicle headlight device as claimed in claim 12, wherein a distance between the light source device and the focus point of the parabolic surface is less than 10 mm.

17. The vehicle headlight device as claimed in claim 12, further comprising:
at least one prism structure disposed on a surface of the light pattern adjustment unit facing away from the light guide plate, wherein the prism structure has a gradually varied thickness.

18. The vehicle headlight device as claimed in claim 12, further comprising:
a plurality of longitudinal slots disposed on the parabolic surface, wherein at least a part of the light beam incident on the longitudinal slots of the light reflection side is reflected towards the light pattern adjustment unit.

19. The vehicle headlight device as claimed in claim 18, wherein the longitudinal slots are arranged on the parabolic surface in a direction substantially perpendicular to the light emitting surface, and a length of each of the longitudinal slots is substantially the same as a length of the parabolic surface.

20. The vehicle headlight device as claimed in claim 12, further comprising:
- a reflective element disposed adjacent to the bottom surface of the light guide plate, wherein the reflective element has a first inclined surface near the light incident side and a second inclined surface near the light reflection side, an angle formed between the first inclined surface and the bottom surface of the light guide plate is between 65 degrees and 90 degrees, and an angle formed between the second inclined surface and the bottom surface of the light guide plate is between 2 degrees and 30 degrees.

* * * * *